(12) United States Patent
Wu

(10) Patent No.: US 9,443,450 B2
(45) Date of Patent: Sep. 13, 2016

(54) DISPLAY ELEMENT, DISPLAY DEVICE AND JOINT DISPLAY

(71) Applicant: Ye Xin Technology Consulting Co., Ltd., Hsinchu (TW)

(72) Inventor: I-Wei Wu, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 284 days.

(21) Appl. No.: 14/164,137

(22) Filed: Jan. 25, 2014

(65) Prior Publication Data

US 2014/0218956 A1   Aug. 7, 2014

(30) Foreign Application Priority Data

Feb. 5, 2013 (TW) .............................. 102104489 A
Sep. 27, 2013 (TW) .............................. 102135218 A

(51) Int. Cl.

| G09F 9/302 | (2006.01) |
|---|---|
| G09F 9/33 | (2006.01) |
| G09F 9/35 | (2006.01) |
| G02B 6/08 | (2006.01) |
| G02F 1/1333 | (2006.01) |
| G02F 1/1335 | (2006.01) |

(52) U.S. Cl.
CPC ............... *G09F 9/3026* (2013.01); *G02B 6/08* (2013.01); *G02F 1/13336* (2013.01); *G02F 1/133526* (2013.01); *G09F 9/33* (2013.01); *G09F 9/35* (2013.01)

(58) Field of Classification Search
CPC ... F21V 33/0052; G02B 6/08; G02B 6/0058; G09F 9/3026; G02F 1/13336
See application file for complete search history.

(56) References Cited

U.S. PATENT DOCUMENTS

| 6,927,908 B2* | 8/2005 | Stark .................... G02F 1/13336 345/1.3 |
|---|---|---|
| 2006/0001796 A1 | 1/2006 | Chang et al. |
| 2014/0071657 A1* | 3/2014 | Sekiguchi ............. G02F 1/1333 362/97.1 |

FOREIGN PATENT DOCUMENTS

CN           101447144 A       6/2009

\* cited by examiner

*Primary Examiner* — David V Bruce
(74) *Attorney, Agent, or Firm* — Zhigang Ma

(57) ABSTRACT

A display device includes a display element and an image compensation element. The display element includes a main display region and a first periphery display region located at a first side of the main display region, each of the main display region and the first periphery display region includes a plurality of pixels, and a pixel density of the main display region is smaller than a pixel density of the first periphery display region. The image compensation element includes a compensation portion corresponding to the periphery display region, and the image compensation element extends an image of the first periphery display region to one side of the first periphery display region away from the main display region.

33 Claims, 13 Drawing Sheets

DISPLAY ELEMENT, DISPLAY DEVICE AND JOINT DISPLAY

CROSS-REFERENCE TO RELATED APPLICATIONS

This application is related to a U.S. patent application Ser. No. 14/164,139 and entitled "APPARATUS FOR COMPENSATING IMAGE OF DISPLAY AND METHOD FOR MANUFACTURING SAME", a U.S. patent application Ser. No. 14/164,140 and entitled "APPARATUS FOR COMPENSATING IMAGE OF DISPLAY AND METHOD FOR MANUFACTURING SAME", a U.S. patent application Ser. No. 14/164,136 and entitled "APPARATUS FOR COMPENSATING IMAGE OF DISPLAY, DISPLAY AND JOINT DISPLAY", and a U.S. patent application Ser. No. 14/164,118 and entitled "DISPLAY DEVICE, JOINT DISPLAY AND BACKLIGHT MODULE". This application also claims the foreign priority application filed in Taiwan as Serial No. 102104489 on Feb. 5, 2013, and Serial No. 102135218 on Sep. 27, 2013. These related applications are incorporated herein by reference

BACKGROUND

1. Technical Field

The present disclosure relates to a display element, a display device including the display element, and a joint display including at least two display elements.

2. Description of Related Art

Display devices are widely used in consumer electronic products. An increasing need is to provide a big display device for displaying an image having big size. Yet, the big display device is expensive. Thus, there is a need for providing a number of display devices having limited sizes to cooperatively display the image having big size.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various embodiments in detail.

Figure 1:
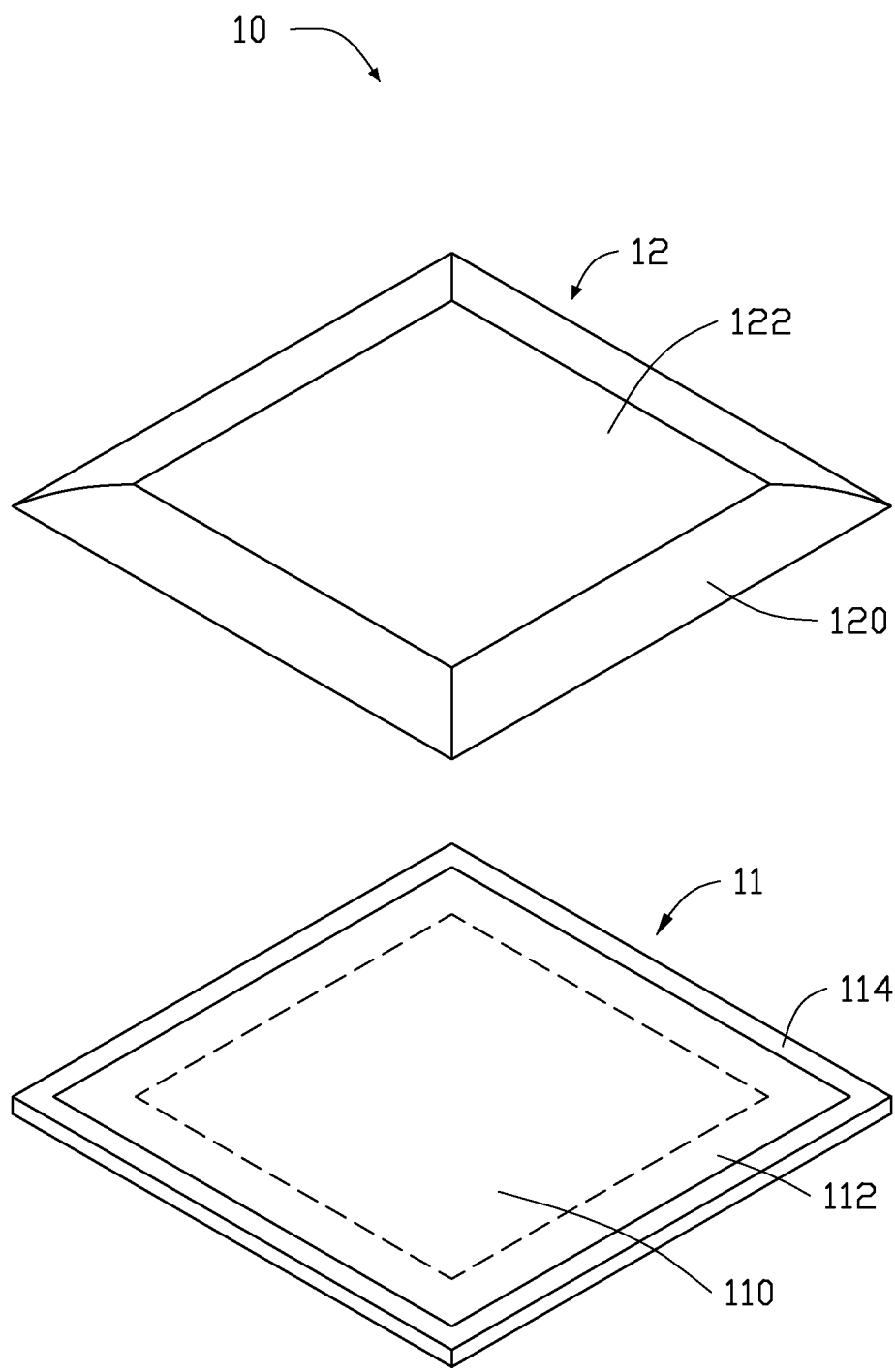
FIG. 1 is a schematic, exploded view of a first kind of display device of the present disclosure.
Figure 2:
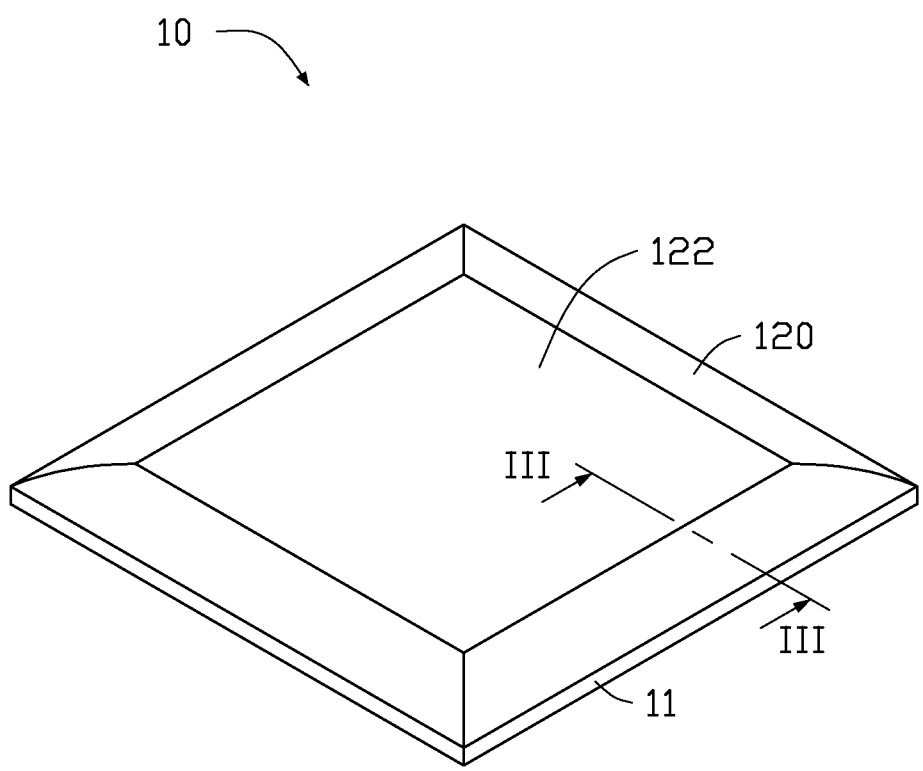
FIG. 2 is a schematic, isometric view of the display device of FIG. 1.
Figure 3:
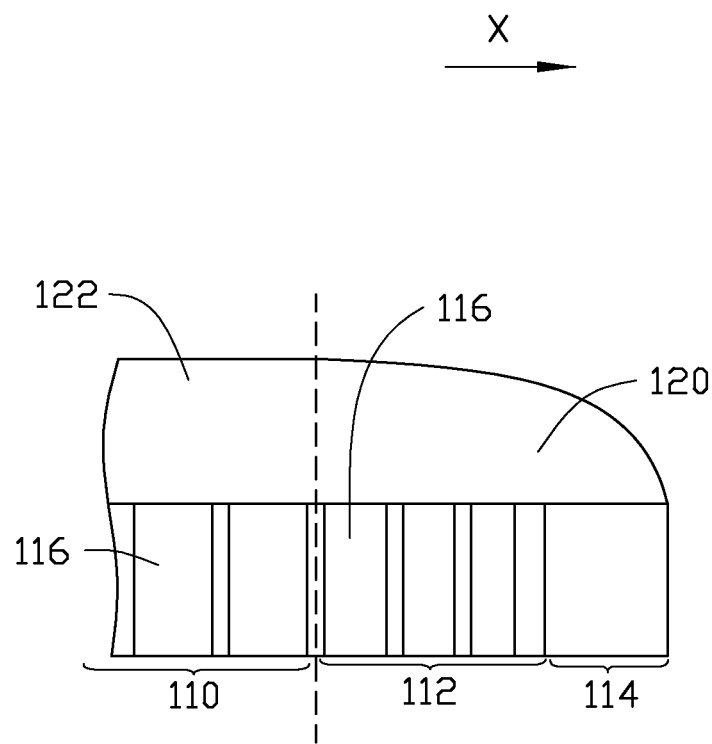
FIG. 3 is a sectional view taken along III-III line of FIG. 2.

FIGS. 1 through 3 show a display device 10. The display device 10 includes a display element 11 and an image compensation element 12. The display element 11 includes a main display region 110, a periphery display region 112 located at one side of the main display region 110 and a non-display region 114. The non-display region 110 can be a frame of the display device 10 which displays no image. It can be understood that the display element 11 can be a display panel or a display panel module which includes a display panel mounted in a frame.

The image compensation element 12 is located above the display element 11, such as on a display surface of the display element 11. The image compensation element 12 includes a compensation portion 120 corresponding to the periphery display region 112 and a transmission portion 122 connected to the periphery portion 112. The compensation portion 120 extends an image of the periphery display region 112 to one side of the periphery display region 112 away from the main display region 110. In detail, the compensation portion 120 extends the image of the periphery display region 112 to the non-display region 114. The compensation portion 120 includes an arc-shaped surface which defines a convex lens structure. The compensation portion 120 covers the periphery display region 112 and is projected at one side of the periphery display region 112 away from the main display region 110. In this embodiment, the compensation portion 120 fully covers the periphery display region 112 and the non-display region 114. The transmission portion 122 covers the main display region 110 and includes a flat light incident surface and a flat light emitting surface parallel to the flat light incident surface.

Figure 4:
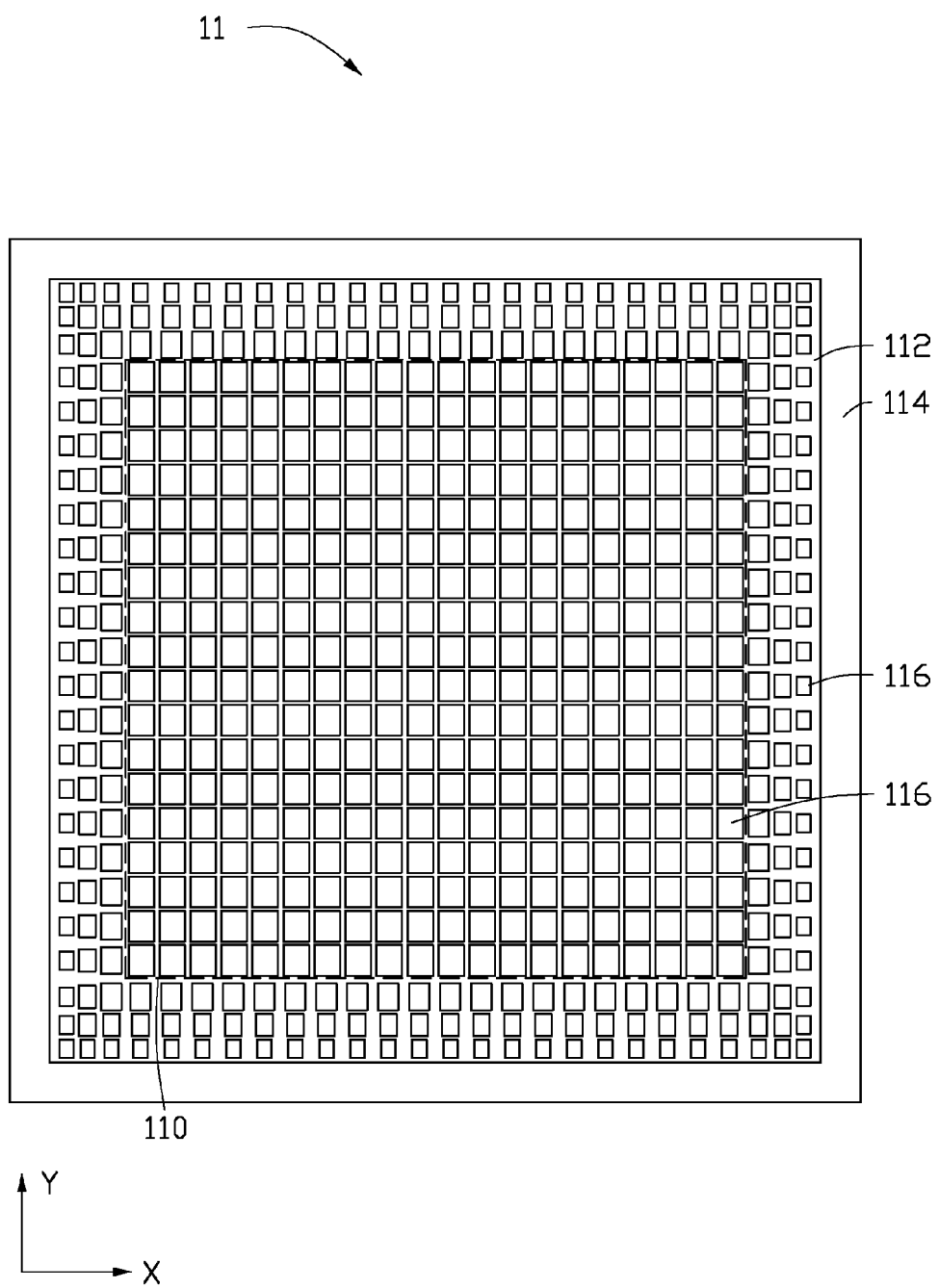
FIG. 4 is a schematic, top view of a display element of the display device of FIG. 1.

FIG. 4 shows the display element 11. The main display region 110 and the periphery display region 112 both include a number of pixels 116. The pixels 116 in the main display region 110 are evenly arranged and are equal in size. A density of the pixels 116 in the main display region 110 (per unit area) is smaller than a density of the pixels 116 in the periphery display region 112. in detail, a space between adjacent pixels 116 in the main display region 110 is substantially equal to or bigger than a space between adjacent pixels 116 in the periphery display region 112, and sizes of the pixels 116 in the periphery display region 112 is smaller than sizes of the pixels 116 in the main display region 110. Such as, lengths of the pixels 116 in the periphery display region 112 is smaller than lengths of the pixels 116 in the main display region 110, or widths of the pixels 116 in the periphery display region 112 is smaller than widths of the pixels 116 in the main display region 110. In this embodiment, lengths and widths of the pixels 116 in the main display region 110 are smaller than lengths and widths of the pixels 116 in the periphery display region 110 respectively. Wherein a length of a pixel 116 is a length of the pixel 116 along a Y direction perpendicular to a X direction, and a width of the pixel 116 is a width of the pixel 116 along the X direction.

In this embodiment, the display element 11 can be display panel, such as liquid crystal display panel and organic light-emitting diode display panel.

Furthermore, the density of the pixels 116 in the periphery display region 112 increases along a direction away from the main display region 110. For example, a density of the pixels 116 in the periphery portion 112 at the right side of FIG. 4 increases along a positive X direction, a density of the pixels 116 in the periphery portion 112 at the top side of FIG. 4 increases along a positive Y direction, densities of the pixels 116 in the periphery portion 112 at the left side and at the right side of FIG. 4 are axial symmetrical, and densities of the pixels 116 in the periphery portion 112 at the top side and at the bottom side of FIG. 4 are axial symmetrical. In detail, spaces between adjacent pixels 116 in the periphery display region 112 can be constant or decrease along a direction away from the main display body 110, lengths of the pixels 116 in the periphery display region 112 decreases along the direction away from the main display region 110, and/or widths of the pixels 116 in the periphery display region 112 decreases along the direction away from the main display region 110.

When working, light emitted from the main display region 110 are substantially changelessly transmitted through the transmission portion 122. The compensation portion 120 changes the transmitting direction of the light emitted from the periphery display region 112 to extend an image of pixels 116 in the periphery display region 112 to one side of the periphery display region 112 (the non-display region 114). The compensation portion 120 amplifies the image of the pixels 116 in the periphery display region 112 to make an image of each pixel 116 in the periphery display region 112 is substantially equal to an image of each pixel 116 in the main display region 110 in size.

The compensation portion 120 extends the image of periphery display region 112 to the non-display region 114, thus, an image displayed by the display element 11 is larger than a sum of the main display region 110 and the periphery display region 112. Furthermore, the non-display region 114 is invisible to a viewer, thus, the display device 10 has a zero border displaying effect.

Figure 5:
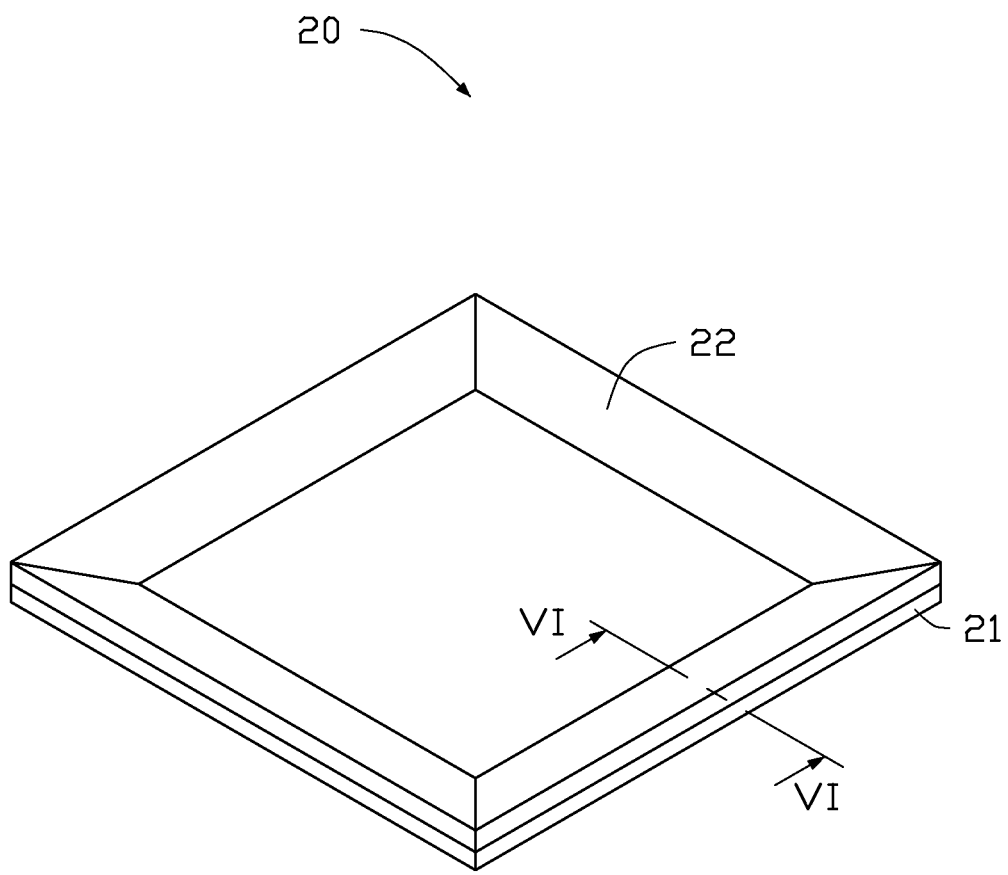
FIG. 5 is a schematic, isometric view of a second kind of display device of the present disclosure.
Figure 6:
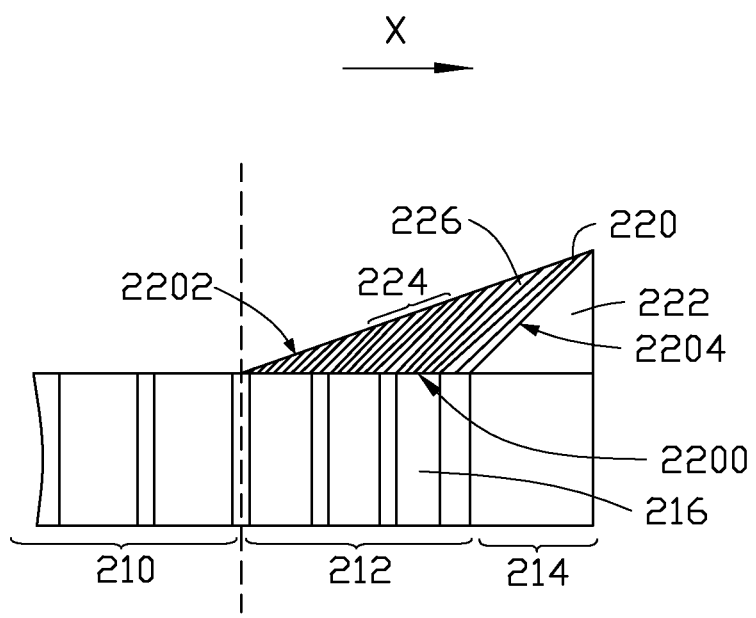
FIG. 6 is a sectional view taken along VI-VI line of FIG. 5.

FIGS. 5 and 6 show a display device 20. The display device 20 is similar to the display device 10 but a structure of a image compensation element 22 of the display device 20 is different from a structure of the image compensation element 12. The image compensation element 22 includes a compensation portion 220 and a support portion 222 connected to the compensation portion 220. The compensation portion 220 corresponds to a periphery display region 212. The compensation portion 220 is projected from the periphery display region 212 and an orthogonal projection of the compensation portion 220 on a display element 21 covers a non-display region 214. The support portion 222 is located on the non-display region 214 and connects to the compensation portion 220.

The compensation 220 includes a number of light guiding channels 224. The light guiding channels 224 amplify images of pixels 216 in the periphery display region 212 and extend the images to one side of the periphery display region 212. An amplifying ratio of the images increase along a positive X direction which is away from a main display region 210.

In detail, the compensation portion 220 includes a light incident surface 2200 and a light emitting surface 2202. The light incident surface 2200 corresponds to the periphery display region 212. An orthogonal projection of the light emitting surface 2202 on the display element 21 is larger than the light incident surface 2200. The light guiding channel 224 extend from the light incident surface 2200 to the light emitting surface 2202. A section area of the light guiding channel 224 increases along the direction from the light incident surface 2200 to the light emitting surface 2202. The light guiding channel 224 extends from the periphery display region 212 to one side of the periphery display region 212 away from the main display region 210. A section of the compensation portion 220 is an obtuse triangle. The compensation portion 20 further includes an inclined surface 2204 connected to the support portion 222. An end of the light emitting surface 2202 is connected to the light incident surface 2200, the other end of the light emitting surface 2202 is connected to the inclined surface 2204. An included angle between the inclined surface 2204 and the light incident surface 2200 is an obtuse angle.

Figure 7:
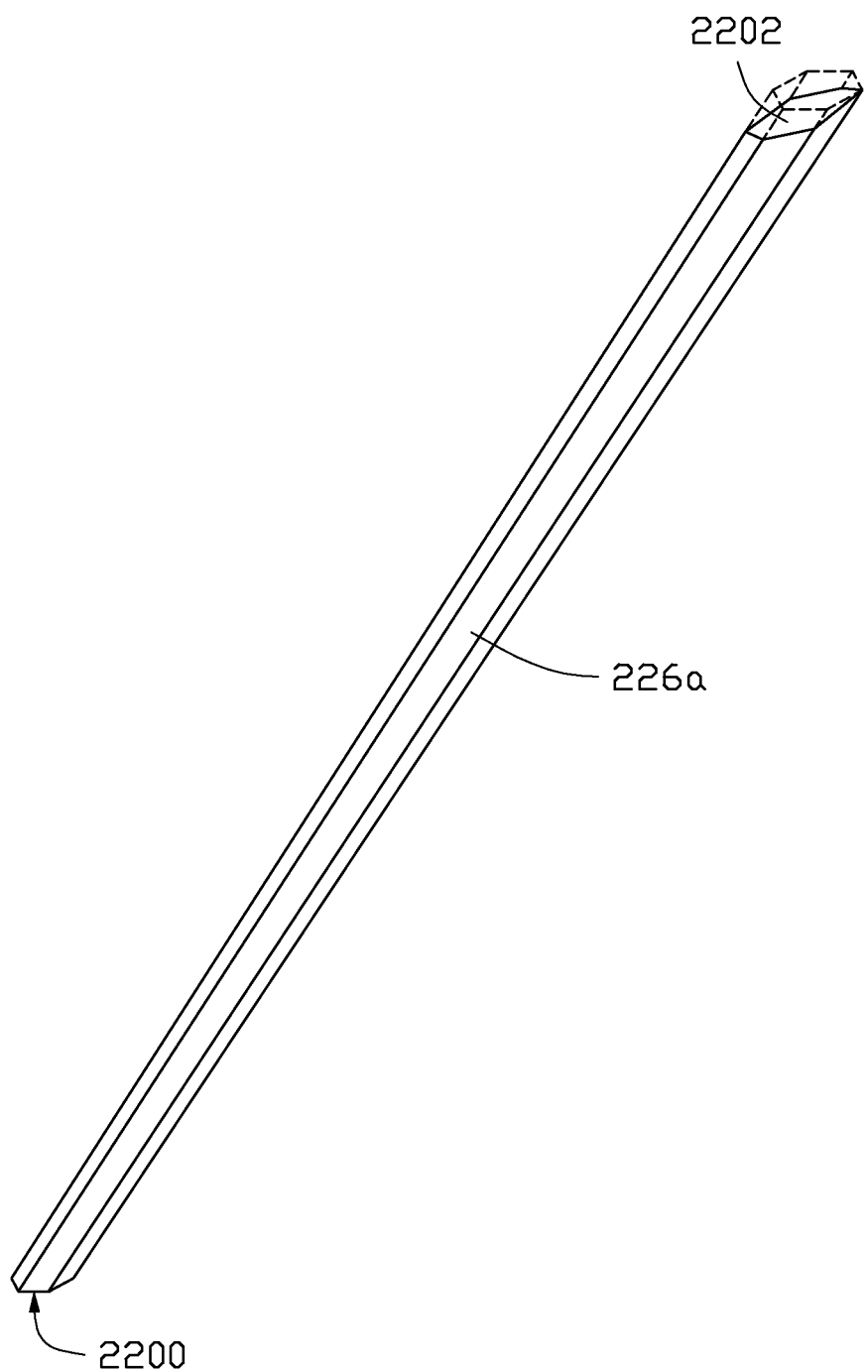
FIG. 7 is a schematic, isometric view of one kind of light guiding fiber.

In this embodiment, the light guiding channels 224 includes a number of optical guiding fibers 226. FIG. 7 shows one kind of optical guiding fibers 226a. An area of the light guiding fiber 226a on the light emitting surface 2202 is greater than an area of the light guiding fiber 226a on the light incident surface 2200, a ratio of the area of the light guiding fiber 226a on the light emitting surface 2202 to the area of the light guiding fiber 226a on the light incident surface 2200 increases along a direction away from the main display region 210, and a section area of the light guiding fiber 226a increases along the direction from the light incident surface 2200 to the light emitting surface 2202 (a diameter of the optical guiding fiber 226a increases along the direction from the light incident surface 2200 to the light emitting surface 2202). In this way, images of pixels 216 in the periphery display region 212 and amplified by the corresponding light guiding channels 224 are substantially equal to each other and equal to images of the pixels 216 in the main display region 212. An amplifying ratio of the light guiding fiber 226a is determined by a ratio of the area of the light guiding fiber 226a on the light emitting surface 2202 to the area of the light guiding fiber 226a on the light incident surface 2200, that is, determined by an inclining degree of the light emitting surface 2202 and an ratio of the diameter of the light guiding fiber 226 on the light emitting surface 2202 to the diameter of the light guiding fiber 226 on the light incident surface 2200.

Figure 8:
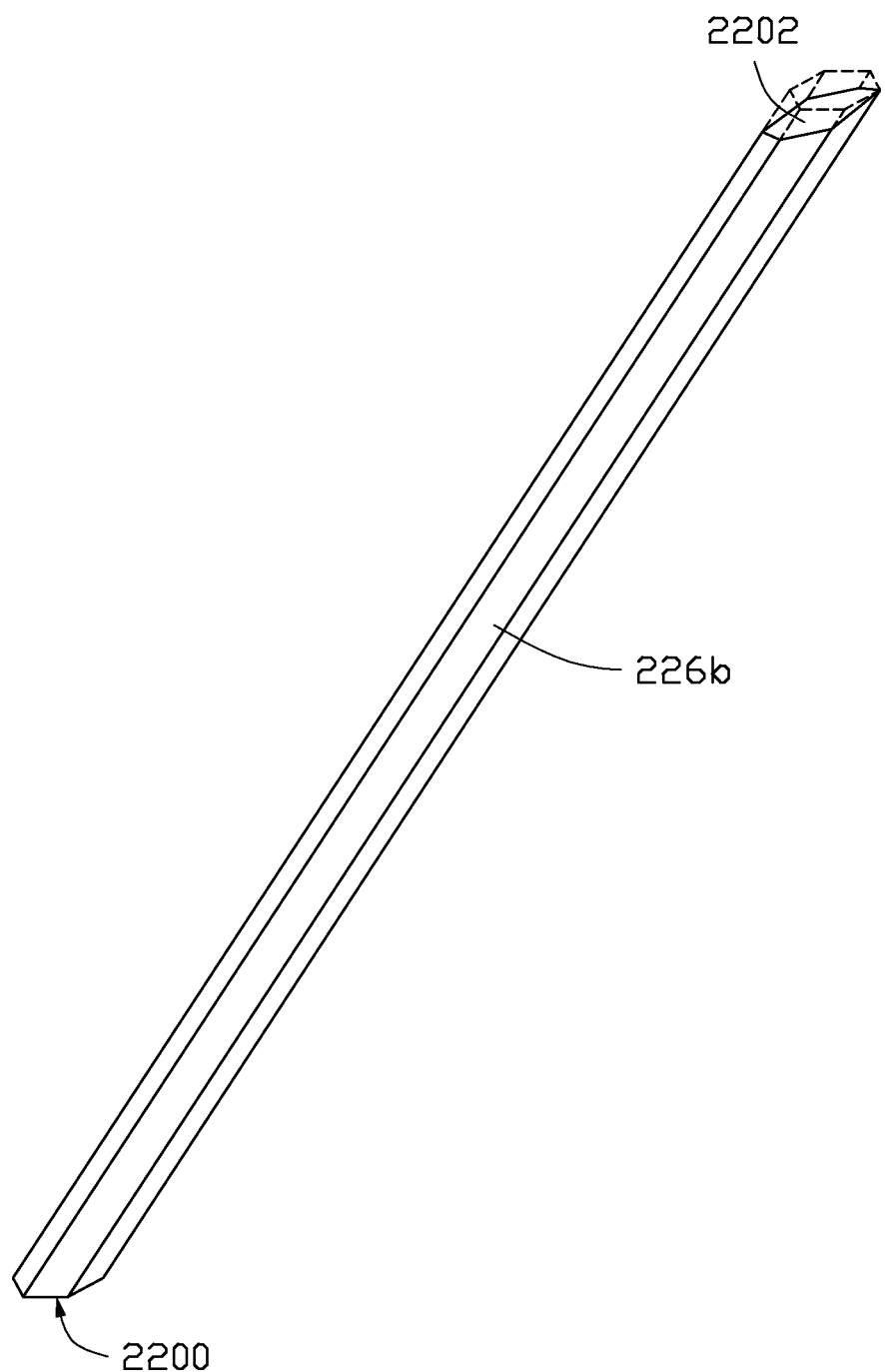
FIG. 8 is a schematic, isometric view of another kind of light guiding fiber.

FIG. 8 shows another kind of optical guiding fiber 226b. The optical guiding fiber 226b extends from the light incident surface 2200 to the light emitting surface 2202. A section area of the optical guiding fiber 226 is constant along the direction from the light incident surface 2200 to the light emitting surface 2202 (a diameter of the optical guiding fiber 226a is constant along the direction from the light incident surface 2200 to the light emitting surface 2202). An amplifying ratio of the light guiding fiber 226a is mainly determined by an inclining degree of the light emitting surface 2202.

In other embodiment, the light guiding channels 224 may include a number of optical fibers, a light guide plate, and so on.

As the image compensation element 12 of the display device 10 defines a convex lens structure, light emitted from the image compensation element 12 is disordered and scattered, which makes the image amplified by the image compensation element 12 has a relatively bad definition. On the contrary, the image compensation element 22 has a number of light guiding channels 224 independent from each other, light emitted from the image compensation element 22 will not be disordered and scattered, which makes image amplified by the image compensation element 22 has a relatively high definition.

Figure 9:
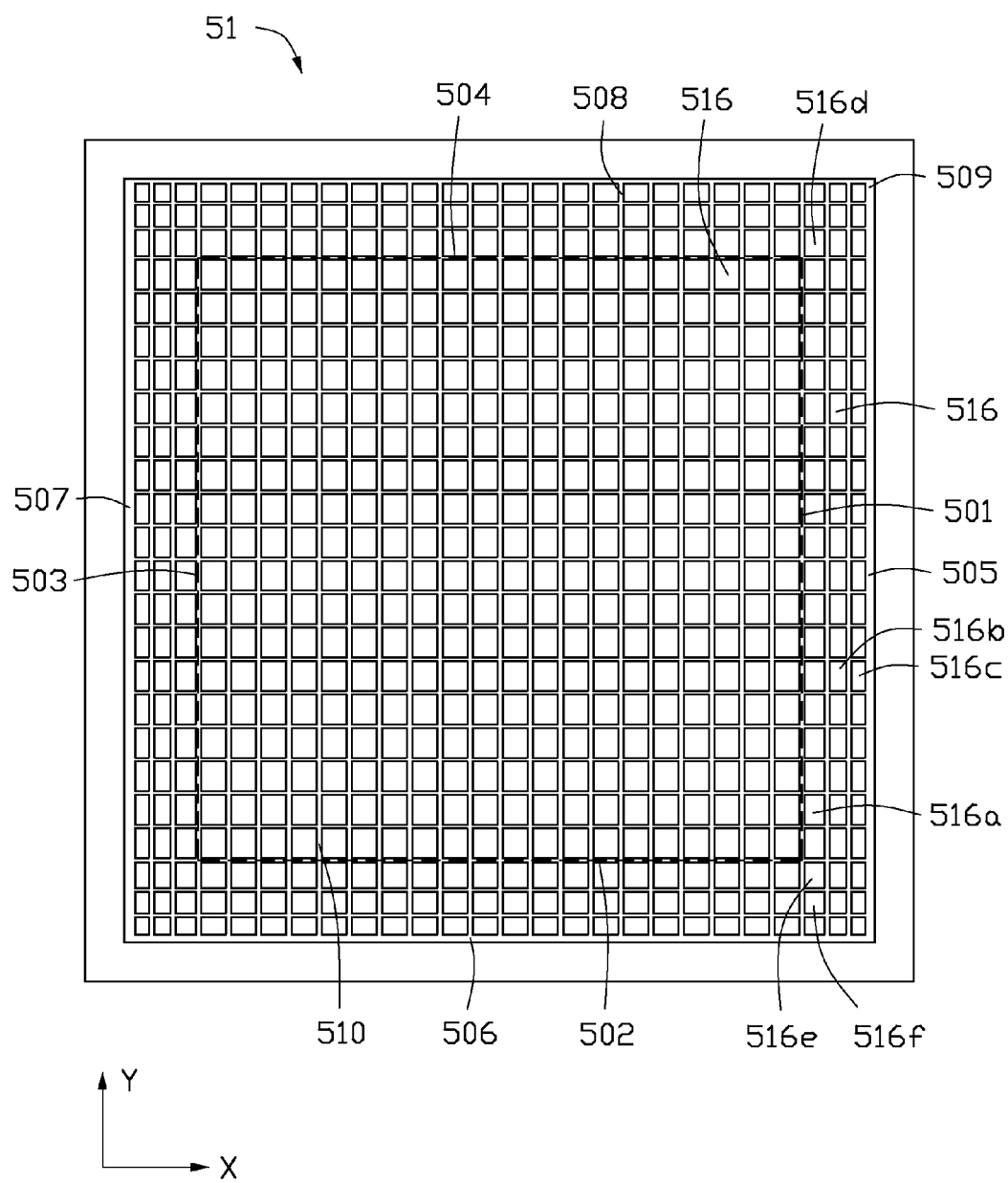
FIG. 9 is a top view of a display element of a third kind of display device of the present disclosure.

FIG. 9 shows a display element 51. The display element 51 is different from the display element 11 shown in FIG. 4.

In detail, a change regulation of the length and the width of pixels 516 in periphery display regions 505 through 508 of the display element 51 differ from a change regulation of the length and the width of pixels 116 in the periphery display region 112 of the display element 11. Wherein a length of a pixel 516 is a length of the pixel 516 along the Y direction perpendicular to the X direction, and a width of the pixel 516 is a width of the pixel 516 along the X direction.

A main display region of the display element 51 includes a first side 501, a second side 502 adjacent to the first side 501, a third side 503 opposite to the first side 501, and a forth side 504 opposite to the second side 502. A first periphery display region 505 is adjacent to the first side 501. A length of the pixel 516 in the first periphery display region 505 is equal to a length of the pixel 516 in the main display region 510, a width of the pixel 516 in the first periphery display region 505 is smaller than a width of the pixel 516 in the main display region 510, and widths of the pixels 516 in the first periphery display region 505 decrease along a direction away from the main display region 510. The first periphery display region 505 includes pixels 516a adjacent to the main display region 510 (in other words, nearest to the main display region 510). A width W1 of the pixel 516a is smaller than a width W2 of the pixels 516 in the main display region 510 at one third, that is, W1=W2-⅓W2=⅔W2. The first periphery display region 505 further includes each two adjacent pixels 516b, 516c arranged in a same row along a direction away from the main display region 510. The pixel 516b is nearer to the main display region 510 relative to the pixel 516c. A width W3 of the pixel 516c is smaller than a width W4 of the pixels 516b at one third, that is, W3=W4-⅓W4=⅔W4.

A second periphery display region 506 is adjacent to the second side 502. A width of the pixel 516 in the second periphery display region 506 is equal to a width of the pixel 516 in the main display region 510, a length of the pixel 516 in the second periphery display region 506 is smaller than a length of the pixel 516 in the main display region 510, and lengths of the pixels 516 in the second periphery display region 506 decrease along a direction away from the main display region 510. The second periphery display region 506 includes pixels 516a adjacent to the main display region 510 (in other words, nearest to the main display region 510). A length L1 of the pixel 516a is smaller than a length L2 of the pixels 516 in the main display region 510 at one third, that is, L1=L2-⅓L2=⅔L2. The second periphery display region 506 further includes each two adjacent pixels 516b, 516c arranged in a same column along a direction away from the main display region 510. The pixel 516b is nearer to the main display region 510 relative to the pixel 516c. A length L3 of the pixel 516c is smaller than a length L4 of the pixels 516b at one third, that is, L3=L4-⅓L4=⅔L4.

A third periphery display region 507 is adjacent to the third side 503. A length of the pixel 516 in the third periphery display region 507 is equal to a length of the pixel 516 in the main display region 510, a width of the pixel 516 in the third periphery display region 507 is smaller than a width of the pixel 516 in the main display region 510, and widths of the pixels 516 in the third periphery display region 507 decrease along a direction away from the main display region 510. The third periphery display region 507 includes pixels 516a adjacent to the main display region 510 (in other words, nearest to the main display region 510). A width W1 of the pixel 516a is smaller than a width W2 of the pixels 516 in the main display region 510 at one third, that is, W1=W2-⅓W2=⅔W2. The third periphery display region 507 further includes each two adjacent pixels 516b, 516c arranged in a same row along a direction away from the main display region 510. The pixel 516b is nearer to the main display region 510 relative to the pixel 516c. A width W3 of the pixel 516c is smaller than a width W4 of the pixels 516b at one third, that is, W3=W4-⅓W4=⅔W4.

A fourth periphery display region 508 is adjacent to the fourth side 504. A width of the pixel 516 in the fourth periphery display region 508 is equal to a width of the pixel 516 in the main display region 510, a length of the pixel 516 in the fourth periphery display region 508 is smaller than a length of the pixel 516 in the main display region 510, and lengths of the pixels 516 in the fourth periphery display region 508 decrease along a direction away from the main display region 510. The fourth periphery display region 508 includes pixels 516a adjacent to the main display region 510 (in other words, nearest to the main display region 510). A length L1 of the pixel 516a is smaller than a length L2 of the pixels 516 in the main display region 510 at one third, that is, L1=L2-⅓L2=⅔L2. The fourth periphery display region 508 further includes each two adjacent pixels 516b, 516c arranged in a same column along a direction away from the main display region 510. The pixel 516b is nearer to the main display region 510 relative to the pixel 516c. A length L3 of the pixel 516c is smaller than a length L4 of the pixels 516b at one third, that is, L3=L4-⅓L4=⅔L4.

A fifth periphery display region 509 is adjacent to each corner of the main display region 510. A width of the pixel 516 in the fifth periphery display region 509 is smaller than a width of the pixel 516 in the main display region 510, a length of the pixel 516 in the fifth periphery display region 509 is smaller than a length of the pixel 516 in the main display region 510, and widths and lengths of the pixels 516 in the fifth periphery display region 508 both decrease along a direction away from the main display region 510. The fifth periphery display region 509 includes pixels 516d adjacent to the main display region 510 (in other words, nearest to the main display region 510). A length L1 of the pixel 516d is smaller than a length L2 f the pixels 516 in the main display region 510 at one third, that is, L1=L 2-⅓L2=⅔L2. A width W1 of the pixel 516d is smaller than a width W2 of the pixels 516 in the main display region 510 at one third, that is, W1=W2-⅓W2=⅔W2. The fifth periphery display region 509 further includes each two adjacent pixels 516e, 516f arranged in a same column or in a same row along a direction away from the main display region 510. The pixel 516e is nearer to the main display region 510 relative to the pixel 516f. A length L3 of the pixel 516f is smaller than a length L4 of the pixels 516e at one third, that is, L 3=L4-⅓L4=⅔L4. A width W3 of the pixel 516f is smaller than a width W4 of the pixels 516e at one third, that is, W3=W4-⅓W4=⅔W4.

Furthermore, spaces between pixels 516 in the periphery display regions 505 through 509 is smaller than spaces between pixels 516 in the main display region 510, and spaces between pixels 516 in the periphery display regions 505 through 509 decrease along a direction away from the main display region 510. In this embodiment, each space D1 between pixels 516 in the periphery display regions 505 through 509 is smaller than a space D2 between pixels 516 which is next to the space D1 along a direction towards the main display region 510 at one third, that is, D1=D2-⅓D2=⅔D2.

In detail, for making sure that an image of each pixel 516 in the periphery display regions 505 through 509 after being amplified by the image compensation element 12 or 22 is substantially equal to an image of each pixel 516 in the main display region 510, an image of pixel 516 in the first or third periphery display region 505, 507 only needs to be amplified in a widthwise direction, and does not needs to be amplified in a lengthwise direction; an image of pixel 516 in the second or fourth periphery display region 506, 508 only needs to be amplified in a lengthwise direction, and does not needs to be amplified in a widthwise direction; and an image of pixel 516 in the fifth periphery display region 509 needs to be amplified both in a widthwise direction and in a lengthwise direction.

When the image compensation element 12 having a convex lens structure is used on the display element 51, the light emitting surface of the image compensation element 12 needs to have different radians corresponding to different periphery display regions 505 through 509, so that an image of each pixel 516 in the periphery display regions 505 through 509 after being amplified by the image compensation element 12 is substantially equal to an image of each pixel 516 in the main display region 510.

When the image compensation element 22 is used on the display element 51, different light guiding channels of the image compensation element 22 corresponding to different periphery display regions 505 through 509 have different structures and different amplifying effect so that image of each pixel 516 in the periphery display regions 505 through 509 after being amplified by the image compensation element 12 is substantially equal to an image of each pixel 516 in the main display region 510.

Figure 10:
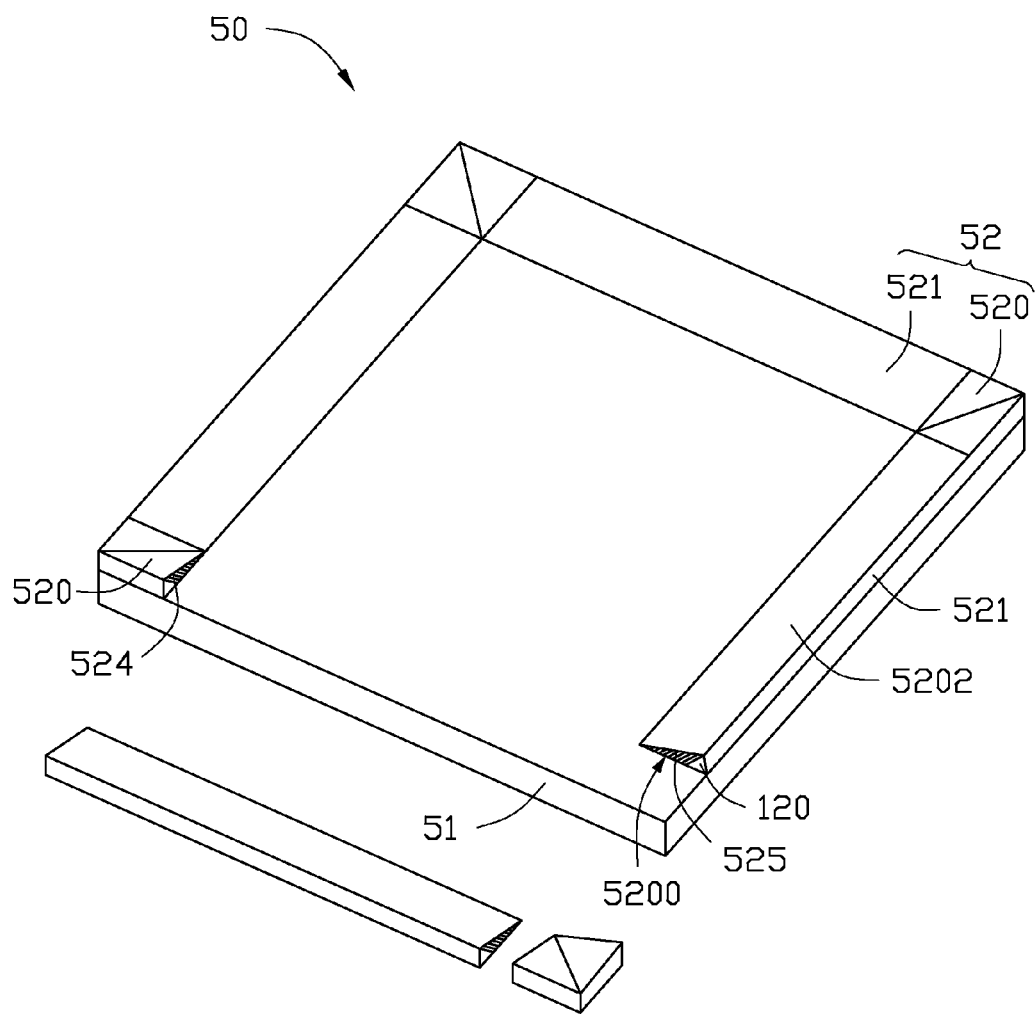
FIG. 10 is a schematic view of the third kind of display device of the present disclosure.

FIG. 10 shows a display device 50 includes the display element 51 and an image compensation element 52 on the display element 51. The image compensation element 52 have light guiding channels. In detail, the image compensation element 52 includes compensation portions 521 corresponding to the first through fourth periphery display regions 505 through 508. The compensation portion 521 includes light guiding channels 525 constructed by light guiding fibers 226b of FIG. 8, that is, the light guiding channel 525 extends from a light incident surface 5200 to a light emitting surface 5202, and a section area of the light guiding channel 525 keeps constant. An amplifying ratio of the light guiding channel 525 is mainly determined by an inclining degree of the light emitting surface 5202. The image compensation element 52 further includes compensation portions 520 corresponding to the fifth periphery display regions 509. The compensation portion 520 includes light guiding channels 524 constructed by light guiding fibers 226a of FIG. 7, that is, the light guiding channel 524 extends from the light incident surface 5200 to the light emitting surface 5202, and a section area of the light guiding channel 524 increases from the light incident surface 5200 to the light emitting surface 5202. An amplifying ratio of the light guiding channel 524 is determined by an inclining degree of the light emitting surface 5202 and a ratio of the diameter of the light guiding fiber 226a on the light emitting surface 5202 to the diameter of the light guiding fiber 226a on the light incident surface 5200.

The compensation portions 520, 521 are jointed together by glue or other connecting agent, and are fixed to the display element 51 by glue or other connecting agent.

The pixels 516 in the first and third periphery display regions 505 and 507 are only smaller than pixels 516 in the main display region 510 in width, the pixels 516 in the second and fourth periphery display regions 506 and 508 are only smaller than pixels 516 in the main display region 510 in length, and the pixels 516 in the fifth periphery display regions 509 are smaller than pixels 516 in the main display region 510 both in length and width. In this way, when the display element 51 is made, there is only a need to make gaps between horizontal driving lines and vertical driving lines for driving the pixels 516 (such as scan lines and data lines of a liquid crystal display panel) in the periphery display regions 505 through 509 smaller than that in the main display region 510. Thus, it is relatively simple to make the display element 51.

In another embodiment, the compensation portions 520 corresponding to the fifth periphery display regions 509 includes light guiding channels and light guiding fibers similar to the light guiding channels and light guiding fibers of compensation portions 521 corresponding to the first through fourth periphery display regions 505 through 508. As the pixels 516 is very small in size, people cannot distinguish the difference between the sizes of images of the pixels 516 in the fifth periphery display region 509 and that in the first through fourth periphery display region 505 through 508, thus, the display device can still have a good display effect.

Figure 11:
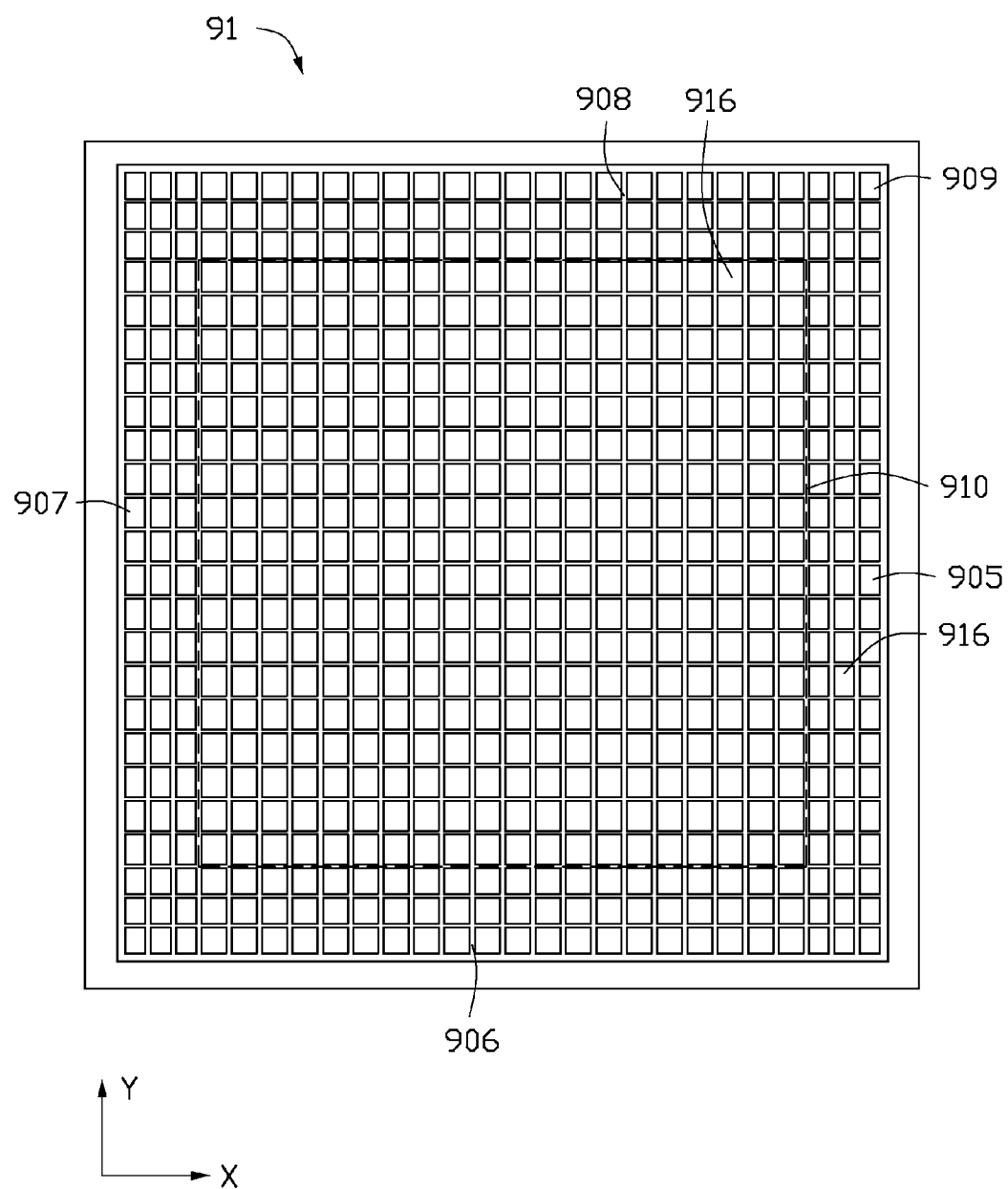
FIG. 11 is a schematic, top view of a display element of a fourth kind of display device of the present disclosure.

FIG. 11 shows a display element 91. The display element 91 is different from the display element 51 shown in FIG. 9. In detail, a change regulation of the length and the width of pixels 916 in periphery display regions 905 through 909 of the display element 91 differ from a change regulation of the length and the width of pixels 516 in the periphery display regions 505 through 509 of the display element 51.

A length of the pixel 916 in the periphery display regions 905, 907 at left and right side of the display element 91 is equal to a length of the pixel 916 in a main display region 910, a width of the pixel 916 in the periphery display regions 905, 907 is smaller than a width of the pixel 916 in the main display region 910, and widths of the pixels 916 in the periphery display regions 905, 907 are equal to each other. A width of the pixel 916 in the periphery display regions 906, 908 at top and bottom side of the display element 91 is equal to a width of the pixel 916 in the main display region 910, a length of the pixel 916 in the periphery display regions 906, 908 is smaller than a length of the pixel 916 in the main display region 910, and lengths of the pixels 916 in the periphery display regions 906, 908 are equal to each other. A width of the pixel 916 in the periphery display regions 909 at the corners of the display element 91 is equal to a width of the pixel 916 in the periphery display regions 905 and 907, and a length of the pixel 516 in the periphery display regions 909 is equal to a length of the pixel 916 in the periphery display regions 906 and 908.

All the above mentioned image compensation elements, optimally, the image compensation element 52 of FIG. 10, can be arranged on the periphery display regions 905 through 909 of the display element 91, to make sure an image of each pixel 916 in the periphery display regions 905 through 909 after being amplified by the image compensation element 52 is equal to an image of each pixel 916 in the main display region 910. As the section area of the light guiding channel 525 of the compensation portion 521 keeps constant, and an area of different light guiding channels 525 at the light emitting surface 5202 are constant, amplifying ratio of images to pixels 916 in each periphery display regions 905 through 908 are constant. As the amplifying ratio and the size of pixels 916 in each periphery display regions 905 through 908 are constant, the size of images of the pixels 916 in each periphery display regions 905 through 908 after amplified are equal to each other. The images of pixel 916 in the periphery display region 909 are amplified both in a widthwise direction and in a lengthwise direction by the compensation portion 520.

Figure 12:
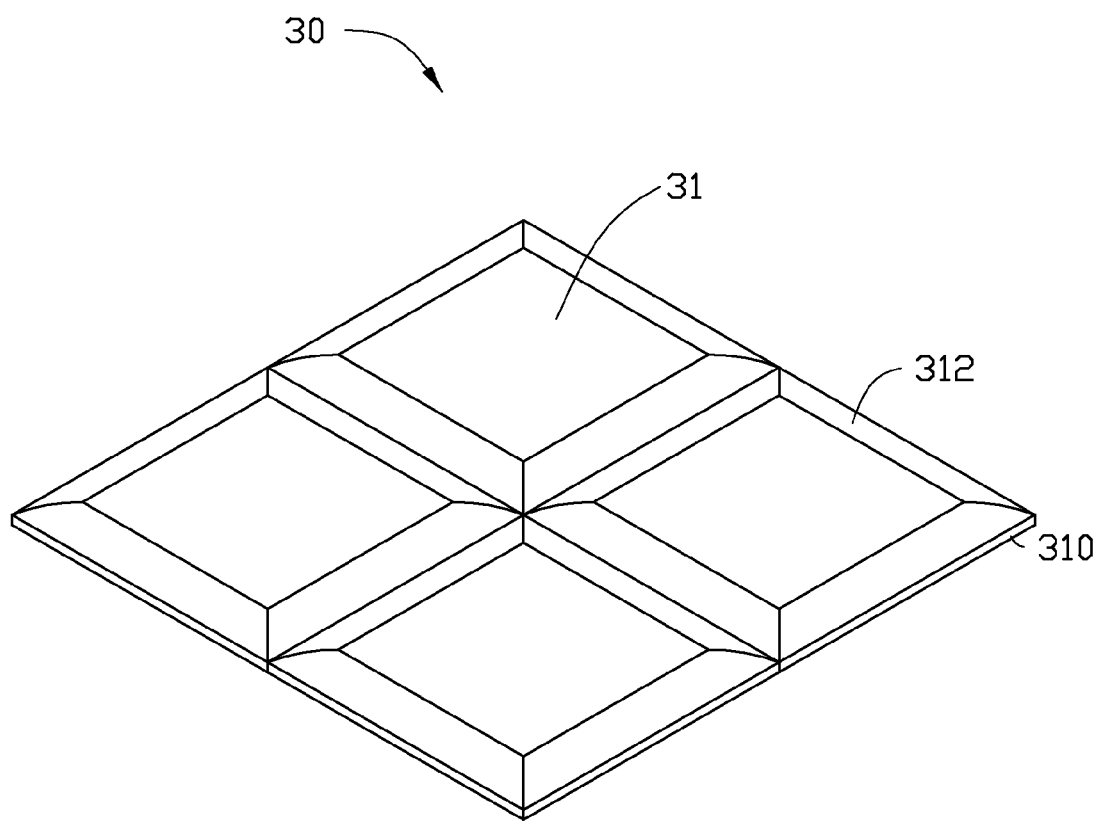
FIG. 12 is a schematic, isometric view of a first kind of joint display of the present disclosure.

FIG. 12 shows a joint display 30. The joint display 30 includes a number of display devices 31 jointed together.

The display device 31 is same as the display device 10 and includes a display element 310 and an image compensation element 312. The display element 310 is same as the display element 11 of FIG. 4, display element 51 of FIG. 9, or display element 91 of FIG. 11.

Figure 13:
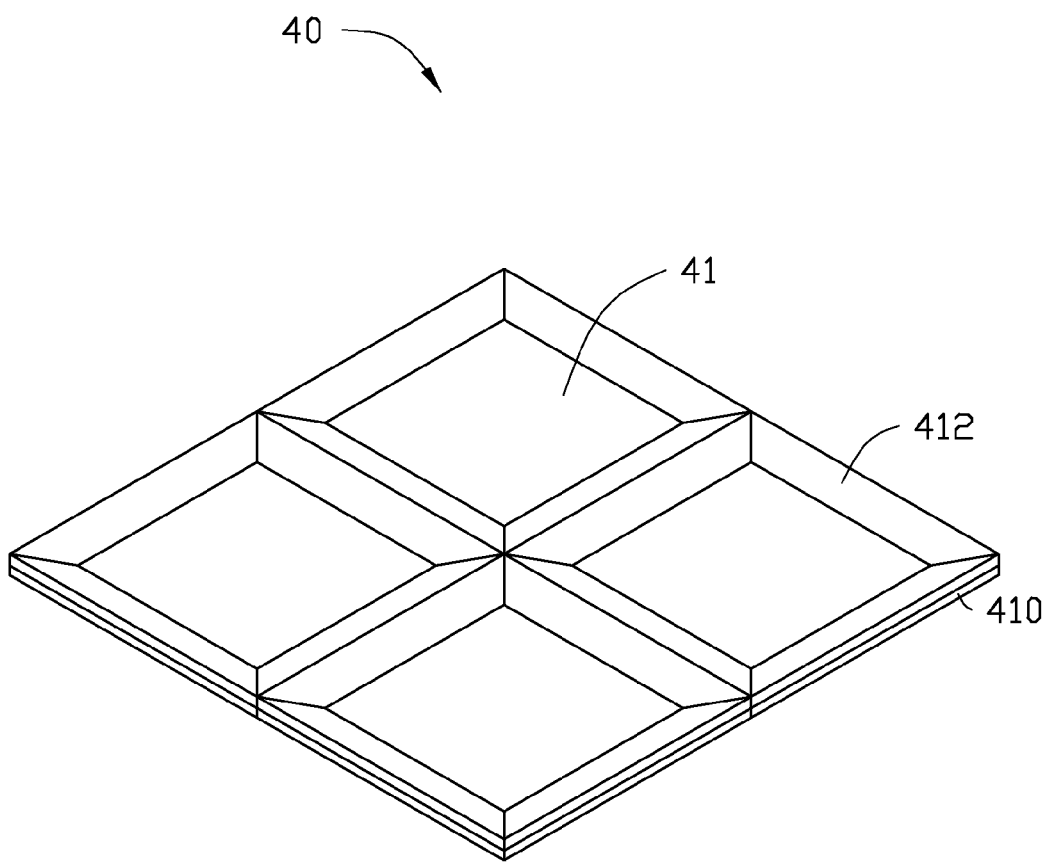
FIG. 13 is a schematic, isometric view of a second king of joint display of the present disclosure.

FIG. 13 shows a joint display 40. The joint display 40 includes a number of display devices 41 jointed together. The display device 41 is same as the display device 20 and includes a display element 410 and an image compensation element 412. The display element 410 is same as the display element 11 of FIG. 4, or display element 51 of FIG. 8. The image compensation element 412 is same as the image compensation elements of FIGS. 5, 6, and 10.

The display elements 310, 410 can be jointed together. The image compensation elements 312, 412 can be jointed together to form a single image compensation element.

As the image compensation elements 312, 412 cover the non-display regions of each display elements 310, 410, the non-display regions are invisible and have no effects to the display effect of the joint display 30, 40. In this way, the display effect of the joint display 30, 40 is enhanced.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

What is claimed is:

1. A display device, comprising:
a display element comprising a main display region and a first periphery display region located at a first side of the main display region, each of the main display region and the first periphery display region comprising a plurality of pixels, and a pixel density of the main display region being smaller than a pixel density of the first periphery display region; and
an image compensation element comprising a compensation portion corresponding to the periphery display region, and the image compensation element extending an image of the first periphery display region to one side of the first periphery display region away from the main display region;
wherein the sizes of the pixels of the first periphery display region gradually decrease along a first direction away from the main display region toward the first periphery display region.

2. The display device of claim 1, wherein a size of each of the pixels of the main display region is greater than a size of each of the pixels of the first periphery display region, each pixel defining a width along the first direction and a length along a second direction perpendicular to the first direction.

3. The display device of claim 2, wherein each pixels in the first periphery display region has the same width; the width of each of the pixels of the first periphery display region is smaller than the width of each of the pixels of the main display region.

4. The display device of claim 3, wherein the length of each of the pixels of the first periphery display region is the same as the length of each of the pixels of the main display region.

5. The display device of claim 3, wherein a ratio of the width of each of the pixels of the main display region to the width of each of the pixels of the first periphery display region is 3/2.

6. The display device of claim 1, wherein the widths of the pixels of the first periphery display region decrease gradually along the first direction away from the main display region toward the first periphery display region.

7. The display device of claim 6, wherein two adjacent pixels of the first periphery display region arranged along the first direction are defined as a first pixel and a second pixel, the second pixel is located at one side of the first pixel away from the main display region, a ratio of the width of the first pixel to the width of the second pixel is 3/2.

8. The display device of claim 1, wherein the pixel density of the first periphery display region increases gradually along the first direction away from the main display region toward the first periphery display region.

9. The display device of claim 1, wherein the display element further comprises a second periphery display region located at a second side of the main display region, the second side of the main display region adjacent to the first side of the main display region, the second periphery display region comprising a plurality of pixels, the pixel density of the main display region being smaller than a pixel density of the second periphery display region.

10. The display device of claim 9, wherein a size of each of the pixels of the main display region is greater than a size of each of the pixels of the second periphery display region.

11. The display device of claim 9, wherein a length of each of the pixels of the second periphery display region is smaller than as a length of each of the pixels of the main display region.

12. The display device of claim 11, wherein a width of each of the pixels of the second periphery display region is the same as a width of the each of the pixels of the main display region.

13. The display device of claim 12, wherein the pixels of the second periphery display region have the same size.

14. The display device of claim 13, wherein a ratio between the length of each of the pixels of the main display region and the length of each of the pixels of the second periphery display region is 3/2.

15. The display device of claim 9, wherein lengths of the pixels of the second periphery display region decrease gradually along the second direction away from the main display region toward the second periphery display region.

16. The display device of claim 15, wherein two adjacent pixels arranged along the second direction of the second periphery display region are defined as a third pixel and a fourth pixel, the third pixel is located at one side of the fourth pixel away from the main display region, a ratio of a length of the third pixel to a length of the fourth pixel is 3/2.

17. The display device of claim 9, wherein sizes of the pixels of the second periphery display region decrease gradually along the second direction away from the main display region toward the second periphery display region.

18. The display device of claim 9, wherein a pixel density of the second periphery display region increases gradually along the second direction away from the main display region toward the second periphery display region.

19. The display device of claim 9, wherein the display element further comprises a corner region connected between the first periphery display region and the second periphery display region, the corner region comprising a plurality of pixels.

20. The display device of claim 19, wherein a width of each of the pixels of the corner region is smaller than a width of each of the pixels of the main region, and a length of the pixels of each of the corner region is smaller than a length of each of the pixels of the main region.

21. The display device of claim 1, wherein a pixel distance is defined between two adjacent pixels, and the pixel distance of the first periphery display region measured along the first direction is smaller than the pixel distance of the main display region measured along the first direction.

22. The display device of claim 1, wherein the display element further comprises a non-display region located at one side of the first periphery display region away from the main display region, and the compensation portion extends the image of the first periphery display region to the non-display region.

23. The display device of claim 22, wherein the compensation portion comprises an arc-shaped surface which defines a convex lens structure, and the compensation portion covers the first periphery display region and the non-display region.

24. The display device of claim 23, wherein the compensation portion defines a plurality of light guiding channels independent from each other, the plurality of light guiding channels transmit light from the first periphery display region to the side of the first periphery display region away from the main display region.

25. The display device of claim 24, wherein the compensation portion comprises a light incident surface and a light emitting surface, the light incident surface corresponds to the periphery display region, an area of the light emitting surface is greater than an area of the light incident surface, and each light guiding channel extends along a direction from the light incident surface to the light emitting surface.

26. The display device of claim 25, wherein the compensation portion comprises a plurality of light guiding fibers each extending along the direction from the light incident surface to the light emitting surface, each light guiding channel is defined by a corresponding light guiding fiber of the plurality of light guiding fibers, and an area of the light guiding fiber on the light emitting surface is greater than an area of the light guiding fiber on the light incident surface.

27. The display device of claim 26, wherein a section area of the light guiding fiber increases gradually along the direction from the light incident surface to the light emitting surface.

28. The display device of claim 26, wherein a section area of the light guiding fiber is maintained constant.

29. The display device of claim 24, wherein each pixel displays an sub-image, and the sub-image displayed by each pixel of the first periphery display region is enlarged by the light guiding channels, and a size of the enlarged sub-image displayed by each pixel of the first periphery display region is substantially the same as a size of the sub-image displayed by each pixel of the main display region.

30. A joint display, comprising:
a first display element, the first display element comprising a main display region and a first periphery display region located at a first side of the main display region, each of the main display region and the first periphery display region comprising a plurality of pixels, and a pixel density of the main display region being smaller than a pixel density of the first periphery display region;
a second display element joining to the first display element; and
an image compensation element comprising a compensation portion corresponding to the periphery display region, and the image compensation element extending an image of the first periphery display region to one side of the first periphery display region away from the main display region;
wherein the periphery display region comprises a first periphery display region, a second periphery display region, and a corner periphery display region connected with the first periphery display region and the second periphery display region simultaneously; width of each pixels of the first periphery display region along a first direction is the same as width of each pixels of the main display region, and length of each pixels of the first periphery display region is smaller than length of each pixels of the main display region; width of each pixels of the second periphery display region is smaller than width of each pixels of the main display region, and length of each pixels of the second periphery display region is the same as length of each pixels of the main display region; width of each of the corner periphery display region is equal to the width of the pixels of the second periphery display region, and length of each pixels of the corner periphery display region is equal to the length of each pixels of the first periphery display region.

31. The joint display of claim 30, wherein the first display element further comprises a non-display region located at one side of the periphery display region away from the main display region, and the compensation portion extends the image of the periphery display region to the non-display region.

32. The joint display of claim 31, wherein the first periphery display region and the non-display region are located between the main display region of the first display element and the second display element.

33. A display element, comprising:
a main display region; and
a first periphery display region located at a first side of the main display region, each of the main display region and the first periphery display region comprising a plurality of pixels, and a pixel density of the main display region being smaller than a pixel density of the first periphery display region;
wherein pixels of the first periphery display region have the same size, and pixels of the main display region have the same size different from the pixels in the first periphery display region; the pixel density of the first periphery display region increases gradually along the first direction away from the main display region toward the first periphery display region.

* * * * *